United States Patent [19]
Paul, Jr.

[11] 3,896,834
[45] July 29, 1975

[54] VALVES WITH SPRING VALVE MEMBERS

[76] Inventor: Herman L. Paul, Jr., 720 Old Mill Rd., Wyomissing, Pa. 19610

[22] Filed: Oct. 9, 1973

[21] Appl. No.: 404,591

[52] U.S. Cl. ... 137/625.28; 137/625.33; 251/DIG. 3
[51] Int. Cl.² .......................................... F16K 11/04
[58] Field of Search .................. 137/625.28, 625.33; 251/205, DIG. 3

[56] References Cited
UNITED STATES PATENTS

| | | | |
|---|---|---|---|
| 342,275 | 5/1886 | Walters | 137/625.28 UX |
| 960,080 | 5/1910 | Fay et al. | 137/625.28 X |
| 1,106,633 | 8/1914 | Denchie | 137/625.33 |
| 2,363,279 | 11/1944 | Anschicks | 251/DIG. 3 |

FOREIGN PATENTS OR APPLICATIONS

| | | | |
|---|---|---|---|
| 516,791 | 12/1920 | France | 251/DIG. 3 |

Primary Examiner—Henry T. Klinksiek
Attorney, Agent, or Firm—Thomas E. Tate

[57] ABSTRACT

The disclosure is that of an invention directed to a valve in which the flow controlling valve element is formed as a coiled spring of suitable configuration so that the coils thereof, when in mutual contact, prevent fluid flow and, when separated by distension in an axial direction, permit fluid to flow through the spaces therebetween. The spring valve element may be either normally open or normally closed as when formed as a tubular or frusto-conical compression or tension spring or may be formed as a normally closed flat spirally or convolutely wound spring in which the spirals or convolutions thereof are in mutual contact.

3 Claims, 10 Drawing Figures

VALVES WITH SPRING VALVE MEMBERS

THE INVENTION

This invention relates generally to new and useful improvements in valves for controlling fluid flow and more particularly seeks to provide novel valve constructions for such purposes in which the valve elements as such comprise either normally open or normally closed springs of various constructions and configurations.

It is understood that the valve art has become highly developed over a long period of time and that valves in general have become recognized according to type such as plug valves, gate valves, ball valves, piston valves, butterfly valves, flap valves, springloaded pressure relief valves, etc., the constructions of which generally make it difficult to achieve, for example, a smooth flow throttling effect or a quick opening or closing to or from a full flow condition.

More recently, the problem of quiet operation has become of importance, particularly in connection with submarine or other shipboard installations where minimum noise under action conditions is so desirable.

These and other problems are solved through the use of valves constructed in accordance with this invention in which the fluid passage closures or valve elements per se constitute variously constructed or variously configured normally open or normally closed springs so arranged that, when open, fluid may flow through the spaces between the separated elements thereof.

Therefore, an object of this invention is to provide a novel valve construction that includes a valve body having inlet and outlet passages and a flow regulating element interposed between the inlet and outlet passages and consisting of a coiled spring that can be either axially compressed or elongated through an actuator operable from the exterior of the valve body.

Another object of this invention is to provide a valve of the character stated in which the flow regulating element thereof comprises a tubular coil compression or tension spring in which the helices thereof may be either normally separated to permit fluid to flow in or out of the interior thereof through the spaces between the helices or normally in contact with each other to prevent fluid to flow in or out of the interior thereof.

Another object of this invention is to provide a valve of the character stated in which the flow regulating spring is of generally conical or frusto-conical configuration.

Another object of this invention is to provide a valve of the character stated in which the flow regulating spring is formed from a convolute wound flat strip having a multiplicity of spaced median perforations that become exposed for fluid passage therethrough whenever the spring becomes axially expanded.

A further object of this invention is to provide a valve of the character stated in which the flow regulating spring thereof is installed to function as a pressure responsive element when the valve as a whole is to be used as a safety valve for pressure relief purposes.

A further object of this invention is to provide a valve of the character stated that is simple in design, rugged in construction and economical to manufacture.

With these and other objects, the nature of which will become apparent, the invention will be more fully understood by reference to the drawings, the accompanying detailed description and the appended claims. In the drawings:

Figure 7:
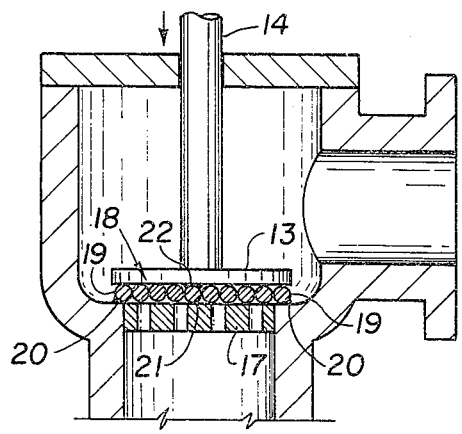
Figure 8:
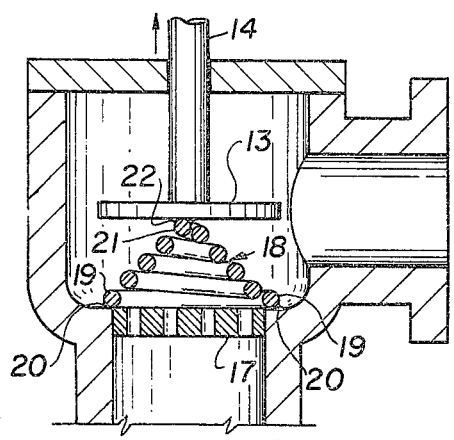
Figure 9:
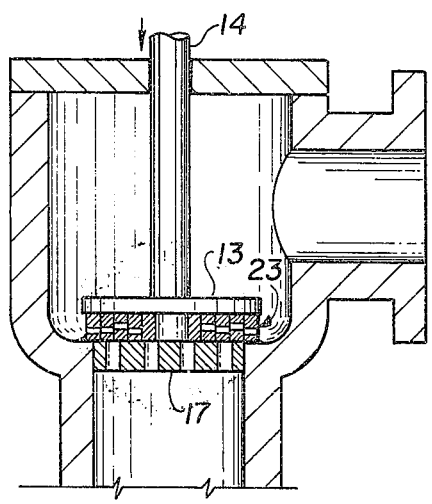
Figure 10:
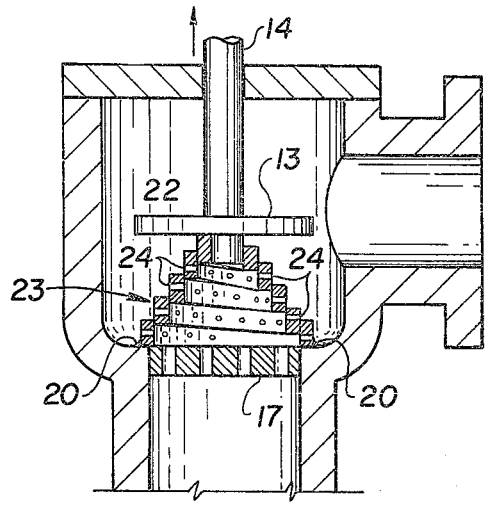

FIGS. 7 and 8 show a further modification in which an orifice plate is fitted within a valve body passage and normally closed by a flat spirally wound spring with the convolutions thereof in contact with each other but axially displaceable to provide spaces therebetween for fluid flow; and FIGS. 9 and 10 show a modification of the valve construction of FIGS. 7 and 8 in which a convolute spring formed from a flat spring strip comprises the valve element and is provided with a multiplicity of median apertures to permit fluid flow whenever the coil is axially distended.

Referring to the drawings in detail the invention, as illustrated, is embodied in a valve (see FIGS. 1 and 2) including a body 5, having an internal cavity 6, inlet and outlet passages respectively indicated 7 and 8 in open communication with the cavity 6, and a bonnet 9 removably attached to the top of the body 5 and closing the upper end of the cacity 6.

Fluid flow between the inlet and outlet passages 7 and 8 is controlled by a valve element, generally indicated 10, which comprises a cylindrical compression spring with the helices 11 thereof normally separated to permit fluid flow therebetween. The valve element 10 is positioned within the cavity 6 in axial alignment with the outlet passage 8 and has its bottom helix 11 welded or otherwise sealed to the bottom of the cavity 6 as at 12. The top of the spring valve element 10 is closed by a disc 13, welded or otherwise sealed thereto, and the disc 13 is affixed to a reciprocable actuating rod 14 operably carried by the bonnet 9. The actuating rod 14 may be moved axially in either direction by any suitable operating means (not shown) such as a threaded stem with handle or knob, pivotal levers or air or hydraulic cylinders, in order to axially compress or release the spring valve element 10 to or from its normally open condition or to or from any intermediate condition, thus achieving either full flow, partial flow or no flow of the fluid so controlled.

Even though the valve element 10 has been described as a compression spring with the helices 11 thereof in a normally open or spaced condition, it should be understood that the same fluid flow control principles would apply if the compression spring were replaced by a tension spring. In the latter event, the helices 11 would be in a normally mutually contacting condition and fluid flow therebetween would be effected by axially elongating the spring, to whatever degree desired, by operation of the actuating rod 14. Further, the cross-sections and geometric configurations of the helices 11 may be varied as desired so long as the helices are still capable of being brought into mutual sealing contact when the valve element 10 is to be in its closed condition. Also, insofar as the principles of operation of the valve element 10 are concerned, as well as those of the subsequently described modifications, it makes no difference whether or not fluid flow takes place from within or from without the valve element, even though for certain types of end uses the preferred fluid flow would be only in a predetermined direction either inwardly or outwardly therethrough.

Figure 3:
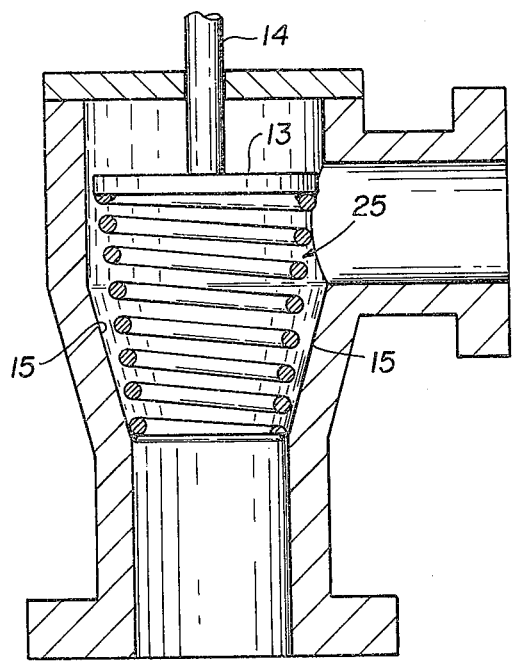
FIG. 3 is a view similar to FIG. 1 but showing a modification in which the valve element is formed as an inverted frusto-conical compression spring that is retained within a complementary frusto-conical section of the valve body.
Figure 4:
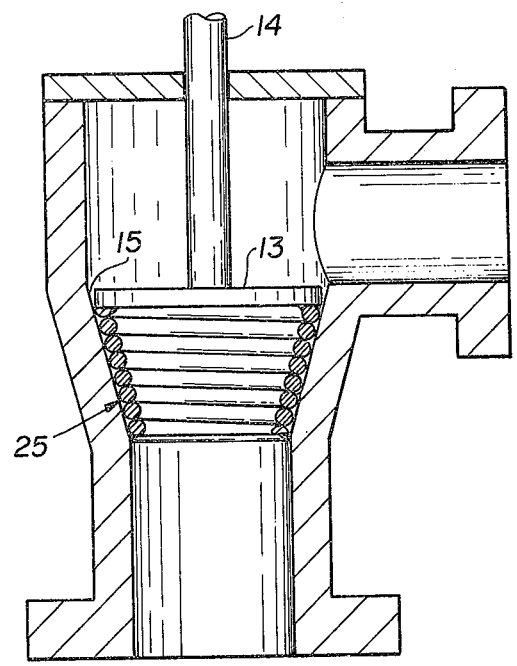
FIG. 4 shows the valve of FIG. 3 in its closed position.

FIGS. 3 and 4 show a modification in which a spring valve element 25 forms a plug when in its closed condition. Here, the lower portion of the internal cavity is provided with an inverted frusto-conical section 15 for complementary association with the valve element 25, which also is of frusto-conical configuration. In FIG. 3 the valve element 25 is in its normally open condition and in FIG. 4 the valve element 25 is in its closed condition with the helices thereof not only in mutual contact but also in sealing contact with the wall of the frusto-conical cavity section 15, thus forming a complete plug therewithin. It is believed that this particular modification will be used more for high pressure installations than for low pressure installations, since the helices of the valve element are additionally supported by the wall 15 of the cavity when closed. However, this particular modification also provides for precise bleeding or throttling control of the fluid, almost regardless of the pressures or pressure differentials involved, due to the geometry of its structure.

Figure 5:
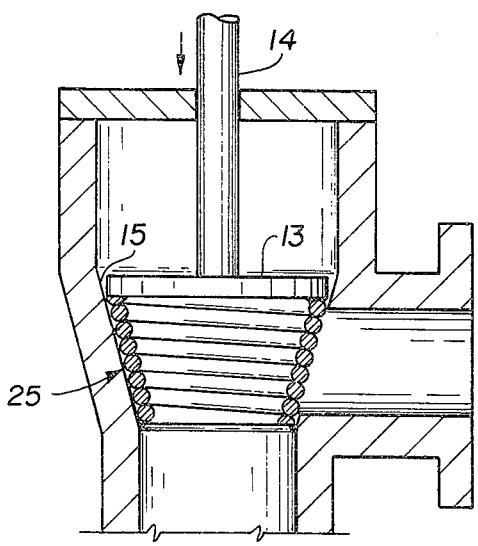
FIG. 5 is a view similar to FIG. 4 but showing a modification in which the valve element spans one of the valve body passages while being axially aligned with another thereof.

If it should be desired to have the plug-forming valve element 25 of FIGS. 3 and 4 actually span the associated end of the inlet passage, such an arrangement can be simply effected, as shown in FIG. 5, by suitably enlarging upwardly the frusto-conical section 15 of the internal cavity to a terminus or plane above the top of the inlet passage and reproportioning and repositioning the valve element 25 accordingly.

Figure 1:
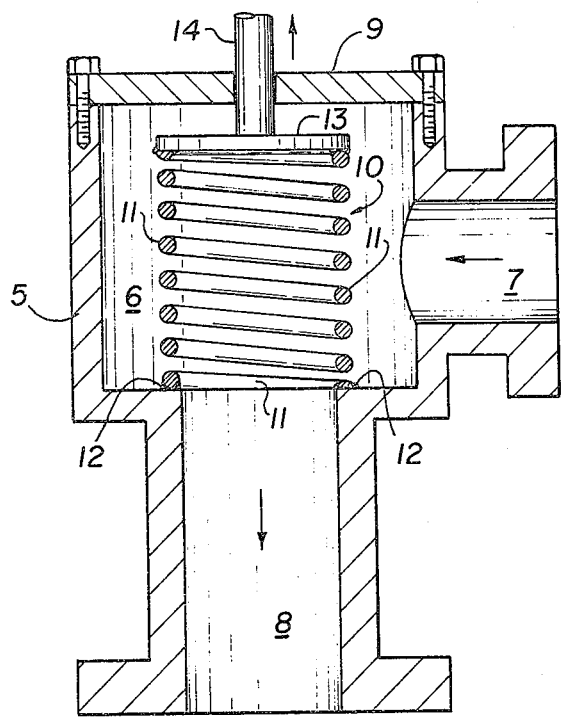
FIG. 1 is a somewhat schematic longitudinal vertical section of a valve constructed in accordance with this invention in which the valve element comprises a cylindrical helically wound compression spring with the helices in a normally separated condition.
Figure 2:
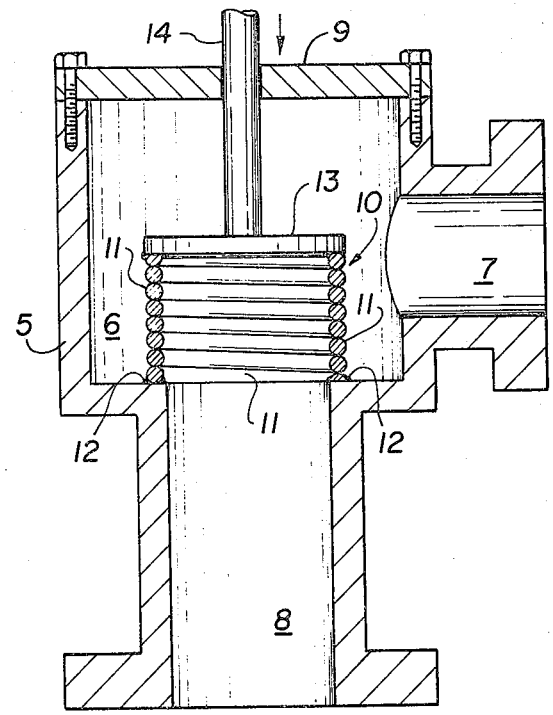
FIG. 2 is a view similar to FIG. 1 but showing the valve element in its closed position with the spring helices in contact with each other.
Figure 6:
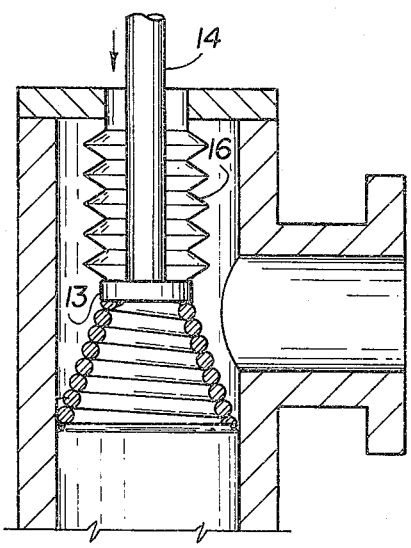
FIG. 6 is a view similar to FIG. 1 but showing a modification in which the valve element is formed as a frusto-conical compression spring with a bellows-type of power cylinder as the actuator.

FIG. 6 shows a modification of the construction of FIGS. 1 and 2 in which a bellows 16 surrounds the actuating rod 14 and extends between the disc 13 and the bonnet so that it may function as the equivalent of a power cylinder. In this modification the valve element is indicated to be of frusto-conical configuration simply to further illustrate that it is not necessary for the valve element to be of any particular configuration so long as the helices thereof can be brought into mutual contact.

The same principles of having mutually contacting helices or convolutions of a spring form a valve closure are further illustrated in the modification of FIGS. 7 and 8 in which an orifice plate 17 is affixed within the outlet passage adjacent the bottom of the cavity. Here, a flat spiral wound spring valve element 18, with mutually contacting convolutions, has its outer convolution 19 welded or otherwise firmly bonded to the adjacent face of the orifice plate 17 as at 20 and at least its first inner convolution 21 welded or otherwise firmly bonded to the adjacent face of the disc 13 as at 22. In the closed position of FIG. 7, the disc 13 maintains the valve element 18 in its flat closed position and, as shown in FIG. 8, the actuating rod 14 serves to lift the disc 13 and axially distend the valve element 18 to an open position. The full span of the disc 13 over the flattened area of the valve element 18 is provided simply as an added precaution to prevent any accidental displacement of the spring convolutions when in their mutually contacting flattened relation.

As shown in the modification of FIGS. 9 and 10, the normally flat coil spring valve element 18 of FIGS. 7 and 8 may be replaced by a convolutely wound spring valve element 23 formed from a flat strip of spring metal and provided with a multiplicity of medianlly disposed apertures 24 to permit fluid flow whenever the valve element 23 becomes axially distended into an open position.

It will be apparent from the foregoing description that the principles of this invention readily may be applied to safety pressure relief valves, where no mechanical operation of the valve is required, simply by using a normally closed tension spring type of valve element, with one end sealed, enclosed within a simple valve body connected to the pressure source and opening into the atmosphere or pressure relief chamber through the valve element.

It will of course be understood that variations in arrangements and proportions of parts may be made within the scope of the appended claims.

I claim:

1. A valve including, a body provided with an internal cavity, inlet and outlet passages extending from the exterior of said body into communication with said internal cavity, a valve element located within said internal cavity for controlling fluid flow from one of said passages to the other thereof, said internal cavity including a portion of inverted frusto-conical configuration adjacent to and in alignment with one of said passages for receiving said valve element, said valve element comprising a coiled spring of frusto-conical configuration complementary to the frusto-conical portion of said internal cavity when the coils of said spring are in a mutually contacting condition, and means operable from without said body and extending into said internal cavity for operating upon said coiled spring valve element in an axial direction whereby to cause the coils thereof to be brought into or out of mutually contacting relation.

2. The valve of claim 1 in which said frusto-conical coiled spring valve element is a compression spring having its coils in a normally separated condition.

3. The valve of claim 1 in which said frusto-conical coiled spring valve element is a tension spring having its coils in a normally mutually contacting condition.

* * * * *